United States Patent [19]

Allen et al.

[11] Patent Number: 5,663,495

[45] Date of Patent: Sep. 2, 1997

[54] DETECTING A MARKER IN AN ENGINE POSITION SENSING SYSTEM

[75] Inventors: Murray Allen, Ryton-on-Dunsmore; Andrew John Burnard, Coventry, both of United Kingdom

[73] Assignee: Rover Group, Birmingham, England

[21] Appl. No.: 669,853

[22] Filed: Jun. 26, 1996

Related U.S. Application Data

[63] Continuation of Ser. No. 380,646, Jan. 30, 1995.

[30] Foreign Application Priority Data

Feb. 1, 1994 [GB] United Kingdom ............... 9401835

[51] Int. Cl.$^6$ .................................................. G01M 15/00
[52] U.S. Cl. ................................................... 73/117.3
[58] Field of Search .............................. 73/35.01, 35.03, 73/35.06, 35.07, 112, 116, 117.2, 117.3

[56] References Cited

U.S. PATENT DOCUMENTS

| | | | |
|---|---|---|---|
| 4,694,688 | 9/1987 | Takahashi et al. | 73/116 |
| 4,715,009 | 12/1987 | Bohmler et al. | |
| 4,931,940 | 6/1990 | Ogawa et al. | 73/116 |
| 4,959,996 | 10/1990 | Akasu | 73/116 |
| 5,041,979 | 8/1991 | Hirka et al. | 73/116 |
| 5,056,360 | 10/1991 | Dosdall et al. | 73/116 |
| 5,117,681 | 6/1992 | Dosdall et al. | 73/116 |
| 5,165,271 | 11/1992 | Stepper et al. | 73/116 |
| 5,311,771 | 5/1994 | Young | 73/117.3 |
| 5,377,535 | 1/1995 | Angermaier et al. | 73/116 |

FOREIGN PATENT DOCUMENTS

| | | |
|---|---|---|
| 0 150 642 | 8/1985 | European Pat. Off. |
| 0 298 824 | 1/1989 | European Pat. Off. |
| 2 065 310 | 6/1981 | United Kingdom. |
| 2 142 436 | 1/1985 | United Kingdom. |

OTHER PUBLICATIONS

Electronique Applications, vol. 27, Dec. 1982–Jan. 1983 pp. 11–14; J L Drotcourt, "Allumage électronique et microprocesseur".

*Primary Examiner*—George M. Dombroske
*Assistant Examiner*—Eric S. McCall
*Attorney, Agent, or Firm*—Davis and Bujold

[57] ABSTRACT

An engine position sensing system is of the type in which a toothed wheel having circumferentially spaced marks is mounted on the engine crankshaft with a sensor located adjacent the toothed wheel to detect passing marks. The engine rotational position is indicated by a marker on the toothed wheel defined by a missing tooth. The marker is detected by taking the previous, current and subsequent intervals A, B and C respectively between marks and performing an operation thereon in which the current interval B and the previous and subsequent intervals A and C are processed and compared with a constant K according to the formula $B^2/(A \times C) > K$. Upon detection of the marker an appropriate signal can be generated and sent to an engine management system. K is preferably between 2.6 and 3.5 and typically 3.

17 Claims, 2 Drawing Sheets

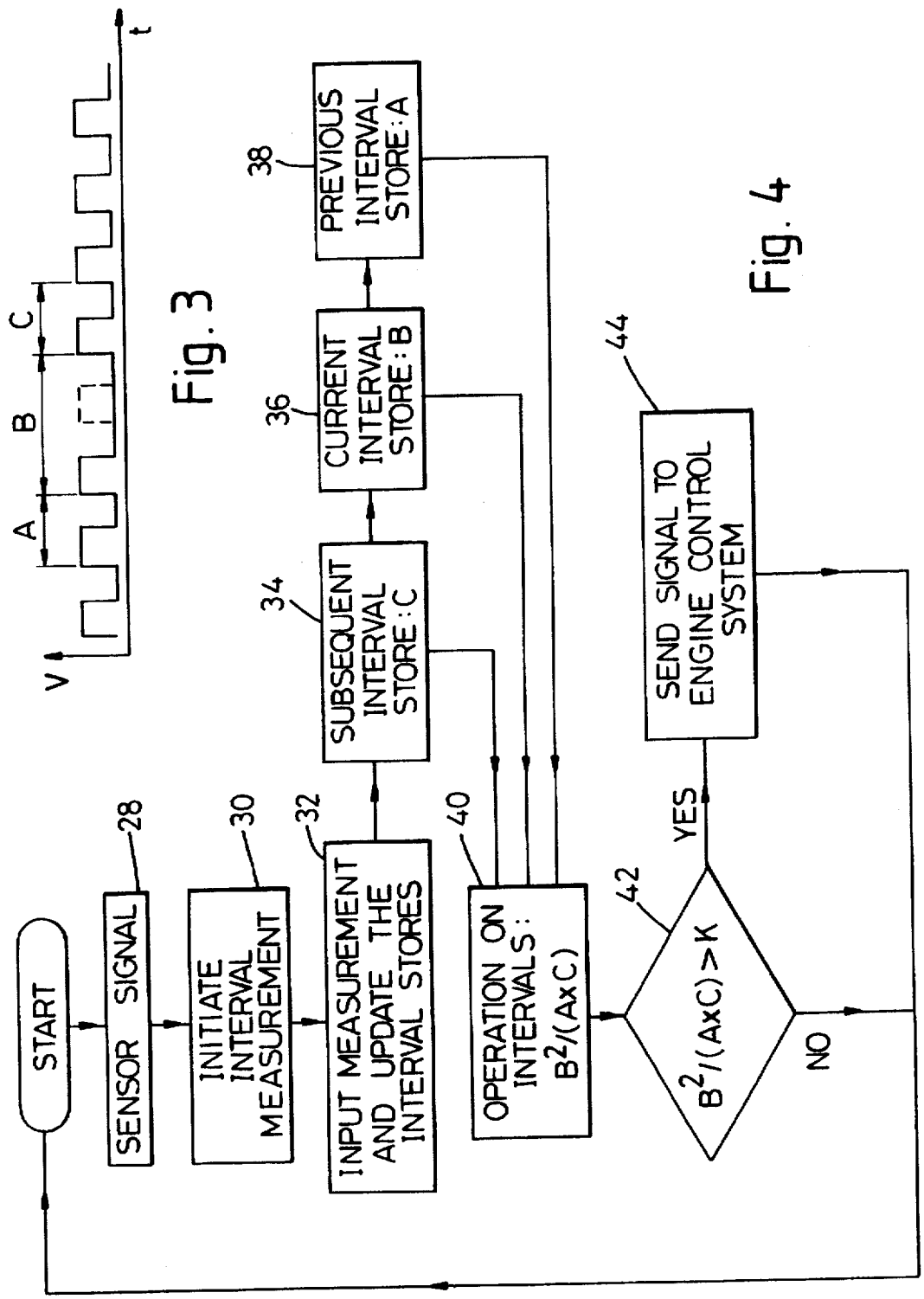

DETECTING A MARKER IN AN ENGINE POSITION SENSING SYSTEM

This application is a continuation of copending application(s) Ser. No.08/380,646 filed on Jan. 30, 1995.

The invention relates to method of detecting a marker in an engine position sensing system and to an engine position sensing system which in use operates according to such a method.

A known system of determining engine crankshaft position comprises a toothed wheel fixed to the engine crankshaft and an inductive sensor mounted near the wheel which produces a pulse signal as each tooth on the wheel passes the sensor. The wheel includes a marker in the form of a missing tooth and processing circuitry which receives the pulse signals can recognise the missing tooth by timing the interval between signals.

In GB-A-2065310 a missing tooth is identified by a counter which counts back towards zero and is reset by each pulse signal. The interval between teeth is such that the counter does not normally reach zero before being reset, and when a missing tooth passes, the interval is long enough to allow the counter to reach zero. When the counter reaches zero the processor sends an appropriate signal to indicate engine position. This is conveniently referred to as a "tooth-after" strategy.

In GB-A-2142436 a missing tooth marker is detected by timing the intervals between teeth and comparing a measured interval with the previous interval. If the measured interval is less than a detect parameter which results from the product of the previous interval and a detect factor, typically 0.65, then the previous interval is deemed to have included the marker. This is conveniently referred to as a "tooth-before" strategy.

Both of the "tooth-after" and the "tooth-before" strategies are prone to errors when the engine is accelerating or decelerating rapidly. For instance, with a tooth-after strategy a rapid drop in engine speed increases the length of the interval between teeth which may allow the counter to reach zero and thus falsely signal a missing tooth marker. A rapid drop in engine speed with a tooth-before strategy may result in a missing tooth marker not being detected at all as the interval after a missing tooth could be increased in duration sufficiently so as to be greater than the detect parameter and thus no signal would be produced. When a rapid rise in engine speed occurs, the opposite may be the case, i.e. GB-A-2065310 may miss a marker while GB-A-2142436 may falsely indicate a marker. In US-A-4715009 there is an attempt to combine "tooth-after" and "tooth-before" strategies but this does not eliminate the problems of each under extremes of engine acceleration or deceleration.

It is an object of the present invention to provide an improved method of detecting a marker in an engine position sensing system which is less susceptible to the errors mentioned above.

In accordance with one aspect of the invention there is provided a method of detecting a marker in an engine position sensing system, the system comprising a rotatable member having thereon regularly circumferentially spaced marks and at least one marker thereon defined by a change in spacing between the marks, sensor means arranged near the rotatable member for sensing the marks and for providing sensor signals in response to movement of the marks relative to the sensor means and processing means for receiving and processing the sensor signal, the method comprising the steps of receiving said sensor signals in the processing means to indicate previous, current and subsequent intervals between the marks, measuring the intervals, performing an operation which compares the current interval with the previous and subsequent intervals and provides a result and comparing said result with a reference value to determine the presence of a marker.

The method may further include the step of generating a marker signal upon detection of the marker which marker signal may be transmitted to an engine management system.

The invention also provides in accordance with another aspect thereof an engine position sensing system comprising a rotatable member having thereon regularly circumferentially spaced marks and at least one marker thereon defined by a change in spacing between the marks, sensor means arranged near the rotatable member for sensing the marks and for providing sensor signals in response to movement of the marks relative to the sensor means and processing means for receiving and processing the sensor signals, the engine position sensing system operating, in use, in accordance with a method comprising the steps of receiving said sensor signals in the processing means to indicate previous, current and subsequent intervals between the marks, measuring the intervals, performing an operation which compares the current interval with the previous and subsequent intervals and provides a result and comparing said result with a reference value to determine the presence of a marker.

Preferably, and in accordance with both aspects of the invention, the marker is detected when the operation performed on the measurements produces a result according to the formula $B^2/(A \times C) > K$, where A is the length of the previous interval, B is the length of the current interval, C is the length of the subsequent interval and K is the reference value. Where the marker is defined by one missing mark interposed between equally spaced marks, K is between 1 and 4, preferably in the range 2.6 to 3.5 and typically 3.

The invention will be described by way of example and with reference to the accompanying drawings, in which:

FIG. 3 is a graph showing a waveform produced by a sensor of the system; and

FIG. 4 is a flow diagram showing the steps involved in determining the presence of a marker.

Figure 1:
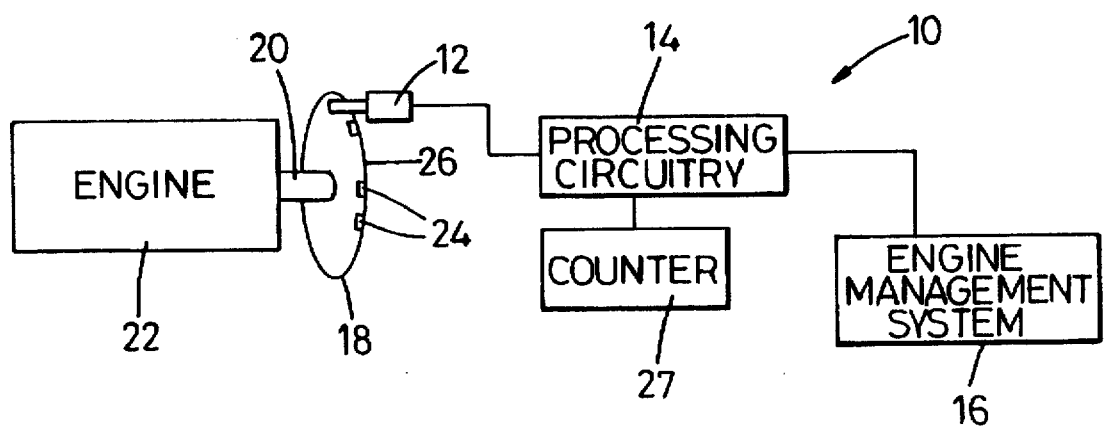
FIG. 1 is a block diagram of an engine position sensing system in accordance with the invention.

In FIG. 1, an engine position sensing system 10 comprises a sensor 12 (constituting the aforesaid sensor means) connected to processing circuitry 14 (constituting the aforesaid processing means) which itself is connected to an engine management system 16. The sensor 12 is an inductive sensor and is mounted adjacent a toothed wheel 18 (constituting the aforesaid rotatable member), the toothed wheel 18 being mounted on crankshaft 20 of an engine 22.

Figure 2:
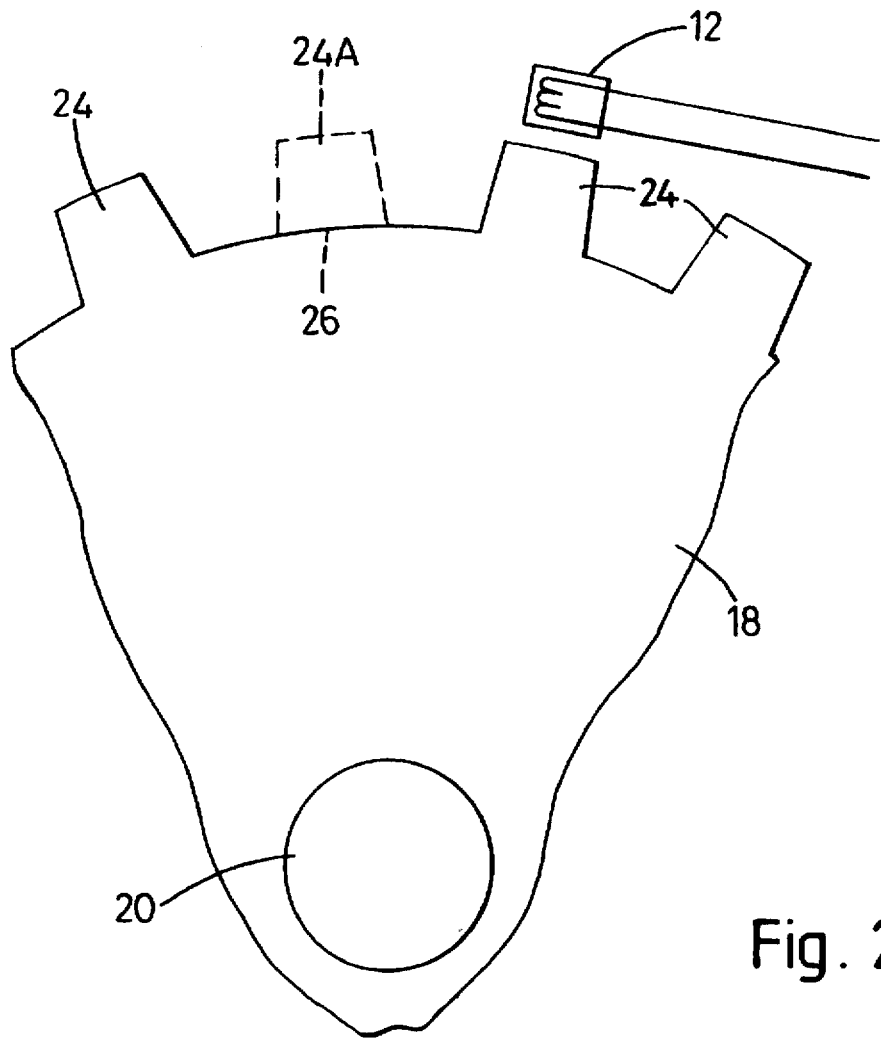
FIG. 2 is an elevation of part of the engine position sensing system of FIG. 1.

The toothed wheel and sensor arrangement is shown in FIG. 2 in more detail, part of the toothed wheel 18 being cut away. The toothed wheel 18 has teeth 24 spaced at regular intervals around its circumference thereby constituting the aforesaid regularly circumferentially spaced marks. The toothed wheel 18 also has a marker 26 on its circumference which is formed by omitting a tooth 24 shown in broken lines as a missing tooth 24A. The inductive sensor 12 is arranged close enough to the teeth 24 on the toothed wheel 18 such that a passing tooth 24 induces a voltage in the sensor 12.

As the toothed wheel 18 and shaft 20 rotate, the teeth 24 move past the sensor 12 and induce a series of voltage pulses as shown in FIG. 3 as a graph of volts V against time t. The pulse signals are supplied to the processing circuitry 14.

Upon receipt of a pulse signal, the processing circuitry 14 initiates a counter 27 which measures intervals between the pulse signals. By comparing one interval with neighbouring intervals as described below it is possible to detect the occurrence of the marker 26 passing the sensor 12.

Upon detection of the marker 26, the engine control system 16 generates a marker signal from which the exact engine crankshaft position can be deduced. The marker 26 may correspond to a top-dead-centre position of the crankshaft 20, but may conveniently be in any other known angular position.

Reference is now made to FIG. 4. With the engine 22 running, the teeth 24 pass the sensor 12 and signals 28 are sent to the processing circuitry 14. The processing circuitry 14 initiates a counter 30 for measuring the intervals between signals 28 and the interval measurements are stored in interval stores 34, 36 and 38, conveniently referred to as the subsequent interval store 34, the current interval store 36 and the previous interval store 38.

At the start of crankshaft rotation the interval stores 34, 36 and 38 are empty so the first two iterations of the process will produce meaningless results. Accordingly, a control routine prevents operation on the values from the interval stores 34, 36 and 38 until at least three intervals have been measured and each store has received a measurement value. Thereafter, each interval store 34, 36 and 38 is updated as will now be described.

The contents of the current interval store 36 are transferred into the previous interval store 38 and stored as interval measurement A, the contents the subsequent interval store 34 are transferred into the current interval store 36 and stored as interval measurement B and the most recent interval measurement is stored in the subsequent interval store 34 as interval measurement C. The interval measurement values A, B, C contained in the three stores 34, 36, 38 are then subject to an operation performed by circuitry 40 in accordance with an algorithm which squares the value B in the current interval store 36 and divides the result by the product of the values A and C in the previous and subsequent interval stores 34, 38 respectively, i.e. it performs the calculation $B^2/(A \times C)$.

Circuitry 42 compares the result of the operation to calculate $B^2/(A \times C)$ with a reference value K, and if the result is greater than K then the marker 26 is deemed to have been detected by the current interval. In FIG. 3 which represents constant speed engine conditions, $B^2/(A \times C)$ equals 4 in the region of the missing tooth 24A. Conversely, where there is no missing tooth $B^2/(A \times C)$ equals 1, although with conventional types of sensor 12 the accuracy may be up to ±10%. Hence a minimum detectable value of $B^2/(A \times C)$ is likely to be $1.1^2$ i.e 1.2.

Under adverse operating conditions, particularly when starting (cranking) the engine at very low ambient temperatures, the angular accelerations and decelerations of the engine near top dead centre may produce a peak value of $B^2/(A \times C)$ equal to 2.6 where there is no missing tooth. Where there is a missing tooth 24A, $B^2/(A \times C)$ may reduce to 3.5 under such adverse operating conditions. Hence the value of the constant K is typically selected between 2.6 and 3.5, e.g. 3.0. The actual values vary according to the design of the engine, depending on factors such as the number of teeth 24 and the engine compression ratio.

Upon detection of the marker 26 a marker signal is generated by circuitry 44 and is transmitted to the engine management system 16 to enable the rotary position of the crankshaft to be deduced. The procedure is then repeated as the next pulse signal 28 is received from the sensor 12.

Accurate crankshaft position data is useful for engine management systems, particularly in controlling fuel injection and spark ignition systems. However, whilst specific reference has been made to engine crankshafts, the method and system of the present invention can be applied to other rotary members of an engine where accurate data with regard to rotational position is required. Whilst specific reference has been made go the provision of one marker 26, two markers can be provided, e.g. at diametrically opposite positions. In such a case, the two markers may conveniently correspond to two top-dead centre positions of an engine crankshaft The invention is applicable to other types of sensor and marks, optical systems or other inductive systems using marks formed from slots, holes or material variations.

We claim:

1. A method of detecting a marker in an engine position sensing system, the system comprising a rotatable member having thereon equally spaced marks arranged circumferentially and at least one marker thereon defined by a change in spacing between the marks, sensor means being arranged adjacent the rotatable member for sensing the marks and for providing sensor signals in response to movement of the marks relative to the sensor means and processing means for receiving and processing the sensor signal, the method comprising the steps of:

(a) receiving said sensor signals by the processing means;

(b) measuring time intervals between successive sensor signals;

(c) designating the time interval between a first sensor signal and a second sensor signal as value A, designating the time interval between the second sensor signal and a third sensor signal as value B and designating the time interval between the third sensor signal and a fourth sensor signal as value C;

(d) using the designated values A, B and C to calculate a result of the measured time intervals according to a formula $B^2/(A \times C)$; and (e) comparing said result with a reference value K such that the presence of a marker is determined when $B^2/(A \times C) > K$.

2. A method in accordance with claim 1 wherein the marker is defined by one missing mark interposed between the equally spaced marks and K is between 1 and 4.

3. A method in accordance with claim 2 wherein K is between 2.6 and 3.5.

4. A method in accordance with claim 2 wherein K is 3.

5. A method in accordance with claim 1 wherein the method further includes the step of generating a marker signal upon detection of the marker.

6. A method in accordance with claim 1 further comprising the steps of:

(f) redesignating value B as value A and value C as value B;

(g) measuring a time interval between the last sensor signal received by the processing means and a new sensor signal received by the processing means;

(h) designating the new time interval as value C; and (i) repeating steps (d) through (h).

7. An engine position sensing system comprising:

a rotatable member having thereon equally spaced marks arranged circumferentially and at least one marker defined by a change in spacing between the marks;

sensor means being arranged adjacent the rotatable member for sensing the marks and for providing sensor signals in response to movement of the marks relative to the sensor means; and processing means for receiving and processing the sensor signals;

wherein the engine position sensing system operates in accordance with a method comprising the steps of:
  (a) receiving said sensor signals by the processing means,
  (b) measuring time intervals between successive sensor signals,
  (c) designating the time interval between a first sensor signal and a second sensor signal as value A, designating the time interval between the second sensor signal and a third sensor signal as value B and designating the time interval between the third sensor signal and a fourth sensor signal as value C,
  (d) using the designated values A, B and C to calculate a result of the measured time intervals according to a formula $B^2/(A \times C)$, and
  (e) comparing said result with a reference value K such that the presence of a marker is determined when $B^2/(A \times C) > K$.

8. An engine position sensing system in accordance with claim 7 wherein the marker is defined by one missing mark interposed between the equally spaced marks and K is between 1 and 4.

9. An engine position sensing system in accordance with claim 8 wherein K is between 2.6 and 3.5.

10. An engine position sensing system in accordance with claim 9 wherein K is 3.

11. An engine position sensing system in accordance with claim 7, wherein the engine position sensing system operates in accordance with the method further comprising the steps of:
  (f) redesignating value B as value A and value C as value B;
  (g) measuring a time interval between the last sensor signal received by the processing means and a new sensor signal received by the processing means;
  (h) designating the new time interval as value C; and
  (i) repeating steps (d) through (h).

12. A method of detecting a marker of an engine position sensing system, the system comprising a rotatable member having thereon a plurality of substantially equally spaced marks arranged circumferentially and at least one marker thereon defined by a change in spacing between adjacent marks, a sensor mechanism being located adjacent the rotatable member for sensing the marks and for generating sensor signals in response to movement of the marks relative to the sensor mechanism, and a processing mechanism for receiving and processing the generated sensor signals, the method comprising the steps of:
  (a) receiving successive a first, second, third and fourth sensor signals by the processing mechanism;
  (b) measuring a time interval between the first and the second sensor signals, the second and the third sensor signals, the third and the fourth sensor signals received by the processing mechanism;
  (c) designating the measured time interval between the first and the second sensor signals as value A, designating the measured time interval between the second and the third sensor signals as value B and designating the measured time interval between the third and the fourth sensor signals as value C;
  (d) using the designated values A, B and C to calculate a result of the measured time intervals according to a formula $B^2/(A \times C)$;
  (e) comparing the result with a reference value K such that a marker is detected when $B^2/(A \times C) > K$;
  (f) redesignating value B as value A and value C as value B;
  (g) measuring a new time interval between the last sensor signal received by the processing mechanism and a new sensor signal just received by the processing mechanism;
  (h) designating the new time interval as value C; and
  (i) repeating steps (d) through (h).

13. A method in accordance with claim 12 further comprising the step of defining the marker by spacing a pair of adjacent marks a greater distance from one another than the spacing between other adjacent pair of marks.

14. A method in accordance with claim 12 further comprising the step of using a value of between 1 and 4 as value K.

15. A method in accordance with claim 12 further comprising the step of using a value of between 2.6 and 3.5 as value K.

16. A method in accordance with claim 12 further comprising the step of using the number 3 as value K.

17. A method in accordance with claim 12 further comprising the step of generating a mark signal upon detection of the marker.

* * * * *